United States Patent Office 3,449,441
Patented June 10, 1969

3,449,441
PROCESS FOR THE MANUFACTURE
OF THIOBISPHENOLS
Brian B. Dewhurst, Detroit, Mich., assignor to Ethyl Corporation, New York, N.Y., a corporation of Virginia
No Drawing. Filed Sept. 16, 1966, Ser. No. 579,834
Int. Cl. C07c 149/36
U.S. Cl. 260—609          8 Claims

ABSTRACT OF THE DISCLOSURE

Sterically hindered halophenols such as 2,6-di-tert-butyl-4-chlorophenol are converted to sterically hindered thiobisphenols by reaction with a metal sulfide such as sodium sulfide in a mutual solvent system. The mutual solvents are mixtures of water with a co-solvent such as a lower alcohol, a water soluble ketone or a water soluble ether alcohol.

---

This invention relates to a process for preparing thiobisphenols. In particular, it relates to a process for making sterically hindered thiobisphenols by the reaction of a sterically hindered hydrocarbyl-substituted halophenol with a metal sulfide in a mutual solvent.

Thiobisphenols are useful as antioxidants. For example, 4,4'-thiobis(6-tert-butyl-meta-cresol) is a commercially accepted antioxidant useful in a broad range of organic materials. More recently, it has been found that 4,4'-thiobis(2-methyl-6-tert-butylphenol) is an extremely useful antioxidant in such media as lubricating oil and polyolefins (U.S. 3,114,713 and U.S. 3,069,384).

These thiobisphenols are usually prepared by the reaction of the appropriate phenol with sulfur dischloride, as described by Steingiser et al. in Australian Patent 201,160. This reaction is satisfactory in many cases, but frequently suffers from the drawback that it leads to mixtures of products. Also, in the case of sterically hindered phenols, the yields of thiobisphenol is low. For example, the reaction of 2,6-di-tert-butylphenol with sulfur dichloride gives only a few precent yield of 4,4'-thiobis(2,6-di-tert-butylphenol). Thus, there is a need for an improved process for manufacturing sterically hindered thiobisphenols.

An object of this invention is to provide an improved process for making sterically hindered thiobisphenols. A further object is to provide a process for making sterically hindered thiobisphenols that are not readily available from the prior art processes.

These and other objects are accomplished by providing a process comprising the reaction of a sterically hindered halophenol with a metal sulfide in a mutual solvent.

An embodiment of this invention is the process of making sterically hindered thiobisphenols by the reaction of a sterically hindered halophenol with a metal sulfide in a mutual solvent selected from the group consisting of: (A) a mixture consisting essentially of from about 10–90 weight percent water and from about 10–90 weight percent of a lower alkanol containing from 1–4 carbon atoms; (B) a mixture consisting essentially of from about 10–90 weight percent water and from about 10–90 weight percent of acetone or methylethylketone; and (C) a mixture consisting essentially of from about 10–90 weight percent water and from about 10–90 weight percent of a water soluble ether alcohol.

A further embodiment of this invention is the process comprising the reaction of a sterically hindered halophenol having the formula:

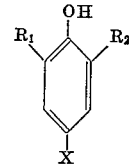

wherein $R_1$ is selected from the group consisting of alpha-branched alkyl radicals containing 3–20 carbon atoms, alpha-branched aralkyl radicals containing 8–20 carbon atoms and cycloalkyl radicals containing 6–20 carbon atoms, and $R_2$ is selected from the group consisting of alkyl radicals containing 1–20 carbon atoms, aralkyl radicals containing 7–20 carbon atoms and cycloalkyl radicals containing 6–20 carbon atoms, and X is selected from the group consisting of chlorine, bromine and iodine with sodium monosulfide in a mutual solvent.

In a preferred embodiment the mutual solvent employed is an aqueous alkanol containing from about 10–90 weight percent water and from about 10–90 weight percent of a $C_{1-4}$ alkanol.

A highly preferred embodiment of this invention is the process comprising the reaction of 2,6-di-tert-butyl-4-chlorophenol or 2,6-di-tert-butyl-4-bromophenol with sodium sulfide in a mutual solvent consisting essentially of from 10–90 weight percent water and from 10–90 weight percent of a $C_{1-4}$ alkanol.

It is highly surprising that the process of this invention proceeds so readily. Normally, nuclear-substituted aromatic halogen compounds are quite resistant to chemical reaction. For example, a temperature of 300° C., 15 atmosphere pressure and a copper salt catalyst are required to convert chlorobenzene to phenol by reaction with sodium hydroxide (the Dow process). One would predict that either an alkali metal sulfide such as sodium sulfide would not react with halophenols or that the sodium sulfide would reduce the halophenol to a phenol by removing the halogen atom.

The preferred sterically hindered halophenols are those having the formula:

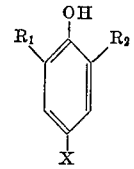

wherein $R_1$ is selected from the group consisting of alpha-branched alkyl radicals containing 3–20 carbon atoms, alpha-branched aralkyl radicals containing 8–20 carbon atoms and cycloalkyl radicals containing 6–20 carbon atoms, and $R_2$ is selected from the group consisting of alkyl radicals containing 1–20 carbon atoms, aralkyl radicals containing 7–20 carbon atoms and cycloalkyl radicals containing 6–20 carbon atoms, and X is selected from the group consisting of chlorine, bromine, and iodine.

Some examples of these phenols are:

2-tert-butyl-6-methyl-4-chlorophenol
2-cyclohexyl-6-ethyl-4-bromophenol
2(α,α-dimethylbenzyl)-6-methyl-4-iodophenol
2-sec-butyl-6-methyl-4-chlorophenol
2-tert-amyl-6-ethyl-4-bromophenol 2-cyclohexyl-6-ethyl-4-iodophenol
2(2,4,6-tri-tert-butyl-cyclohexyl)-6-n-propyl - 4 - chlorophenol
2($\alpha$,$\alpha$-dimethylbenzyl)-6-n-eicosyl-4-bromophenol
2-sec-butyl-6-n-amyl-4-iodophenol
2-sec-octadecyl-6-methyl-4-bromophenol
2-sec-cetyl-6-n-propyl-4-chlorophenol The more preferred phenols are mononuclear phenols in which both positions ortho to the hydroxyl group are substituted with an alpha-branched $C_{3-20}$ alkyl, $C_{6-20}$ cycloalkyl or $C_{8-20}$ aralkyl and the position para to the hydroxyl group is substituted with chlorine, bromine or iodine. Some examples of these are:

2($\alpha$-methylbenzyl)-6-cyclohexyl-4-chlorophenol
2-tert-octyl-6-(2,4-di-ethylcyclohexyl)-4-bromophenol
2[$\alpha$-methyl(2,4 - benzo)benzyl]-6-isopropyl - 4 - iodophenol
2,6-diisopropyl-4-chlorophenol
2,6-di-sec-butyl-4-bromophenol
2,6-di-cyclohexyl-4-bromophenol
2,6-di-cyclohexyl-4-chlorophenol
2,6-di-sec-butyl-4-chlorophenol
2-tert-butyl-6-sec-butyl-4-iodophenol
2-tert-butyl-6-sec-cetyl-4-bromophenol
2,6-di-sec-octadecyl-4-chlorophenol
2,6-di-sec-cetyl-4-bromophenol Highly preferred halophenols are those in which both positions ortho to the hydroxyl are substituted with a radical selected from the group consisting of $C_{4-20}$ tert-alkyl radicals, $C_{8-20}$ alpha-branched aralkyl radicals or $C_{6-20}$ cycloalkyl radicals. Examples of these highly preferred halophenols are:

2-tert-dodecyl-6-($\alpha$-methyl - 4 - phenylbenzyl) - 4 - iodophenol
2,6-di-tert-butyl-4-bromophenol
2,6-di-tert-octadecyl-4-chlorophenol
2-tert-butyl-6-($\alpha$-methylbenzyl)-4-bromophenol
2-tert-cetyl-6-cyclohexyl-4-iodophenol
2-tert-eicosyl-6-(2,4-di-tert-butyl-cyclohexyl) - 4 - bromophenol
2,6-di-tert-decyl-4-chlorophenol
2,6-di-tert-lauryl-4-bromophenol
2($\alpha$,$\alpha$-dimethylbenzyl)-6-tert-butyl-4-chlorophenol The most preferred sterically hindered halophenols are 2,6-di-tert-butyl-4-chlorophenol and 2,6-di-tert-butyl-4-bromophenol.

The term "mutual solvent" as used herein means a solvent having a solvent effect on both the alkali metal sulfide reactant and the phenol reactant. By this it is not meant that both reactants need be completely soluble in the system, but that they must be sufficiently soluble to give a reasonable reaction rate under the conditions employed. For example, it is usually satisfactory if the mutual solvent will dissolve at least one percent of its own weight of each reactant. More preferred mutual solvents will dissolve about 5 percent of their own weight of both the alkali metal sulfide and the sterically hindered halophenol. The most preferred mutual solvents dissolve at least 10 percent of their weight of both reactants.

The mutual solvents contain sufficient water to impart a solubility effect on the alkali metal sulfide and a sufficient amount of a co-solvent or mixture of co-solvents to impart a solubility effect on the sterically hindered halophenols. Suitable co-solvents include water soluble alcohols. The preferred alcohols are those containing from 1-4 carbon atoms such as methanol, ethanol, n-propanol, isopropanol, sec-butanol, isobutanol, and tert-butanol. Another class of co-solvents is the water soluble ketones. Especially preferred are the lower aliphatic ketones containing from 3-4 carbon atoms, viz, acetone and methylethyl-ketone. A still further class of useful co-solvents is the water soluble ether alcohols. These are co-solvents containing both ether and hydroxyl radicals. They are usually made by the condensation of alkylene oxides such as ethylene oxide, propylene oxide, and the like, with hydroxy compounds such as methanol, ethanol, propanol, butanol, ethylene glycol, propylene glycol, and the like. The resulting co-solvents include ether alcohols such as diethylene glycol, triethylene glycol, tetraethylene glycol, the mono-methyl-, ethyl-, propyl- and butyl-ethers of ethylene glycol, diethylene glycol, triethylene glycol, proplene glycol, dipropylene glycol, and other related ether alcohols.

The amount of water and co-solvents required in order to impart the mutual solvent property varies depending on the type co-solvent employed and the sterically hindered halophenol used. Generally, useful mutual solvents contain from about 5-95 weight percent water and from 95-5 weight percent co-solvent. A preferred range is from about 10-90 weight percent water and from 90-10 weight percent co-solvent. A more preferred range is from 10-50 weight percent water and from 50-90 weight percent co-solvent. Naturally, the total percent composition in the above description cannot exceed 100 percent.

The amount of mutual solvent employed can vary over a wide range. Generally, from 2-100 parts of mutual solvent per part of halophenol is satisfactory. A preferred ratio is from about 5-50 parts of mutual solvent per part of halophenol, and a more preferred range is from about 5-20 parts of mutual solvent per part of hindered halophenol.

The temperature at which the process is carried out should be high enough to give a reasonable reaction rate, but not so high as to cause degradation of the reactants or product. A useful range is from 30-300° C. A more preferred range is from about 50-250° C., and a most useful temperature range is from about 75-200° C.

When pressure equipment is not available, the reaction is generally conducted at the atmospheric boiling temperature of the mutual solvent. However, when higher temperatures are desired to effect faster reaction rates, the process may be carried out above atmospheric pressure. A useful pressure range is from atmospheric pressure to about 1000 p.s.i.g. A more useful range is from atmospheric pressure to about 500 p.s.i.g., and a most preferred range is from atmospheric to about 300 p.s.i.g.

The use of an inert atmosphere over the reaction is not required, but is sometimes preferred because it results in a purer product. Hence, it is preferred to conduct the reaction under an inert atmosphere such as nitrogen.

A broad range of metal sulfides are useful in the process. The more useful sulfides are the alkali metal and alkaline earth sulfides. Examples of these materials include barium sulfide, calcium sulfide, magnesium sulfide, sodium sulfides, potassium sulfides, and the like. The most preferred sulfides are sodium monosulfide and sodium monosulfide nonahydrate.

The amount of metal sulfide employed per mole of sterically hindered halophenol can vary over a wide range. Generally, from about 0.4 to 5 moles of sulfide per mole of halophenol is satisfactory. A more preferred range is from 0.4 to 2 moles of sulfide per mole of halophenol, and a most preferred range is from 0.5 to 0.8 mole of sulfide per mole of halophenol.

The process is conducted by mixing together the metal sulfide and hindered halophenol in the mutual solvent, heating and stirring until an optimum yield of the sterically hindered thiobisphenol is formed. This is best shown by the following examples. All parts are parts by weight unless otherwise indicated.

EXAMPLE 1

To a reaction vessel fitted with stirrer, thermometer and reflux condenser was added 28.5 parts of 2,6-di-tert-butyl-4-bromophenol, 12 parts of sodium sulfide nonahydrate, 350 parts of water and 117 parts of isopropanol. The solution was refluxed for 4 hours, at which time 14.5 parts of product had precipitated. This product was recrystallized from aqueous isopropanol, resulting in a material having a melting point of 138–9° C. It was identified by infrared spectrum as 4,4'-thiobis(2,6-di-tert-butylphenol).

When the above reaction was attempted without the addition of the isopropanol co-solvent no product was formed.

EXAMPLE 2

To a reaction vessel equipped as in Example 1 was added 57.2 parts of 2,6-di-tert-butyl-4-bromophenol, 280 parts of methanol, 50 parts of water and 24 parts of sodium monosulfide nonahydrate. The mixture was stirred and refluxed for 4 hours, at which time a solid had precipitated. The solid (42 parts) was recrystallized from aqueous isopropanol and had a melting point of 136–8° C. It was identified as 4,4'-thiobis(2,6-di-tert-butylphenol).

EXAMPLE 3

To the reaction vesel of Example 1 was added 24 parts of 2,6-di-tert-butyl-4-chlorophenol, 12 parts of sodium monosulfide nonahydrate, 280 parts of methanol and 100 parts of water. The reaction was stirred and refluxed for 3 days, at which time 15.1 parts of product had precipitated. This was filtered off and 30 additional parts of sodium monosulfide nonahydrate added to the filtrate. The filtrate was again refluxed one more day, forming 3.2 additional parts of product. The 18.3 parts of product were identified as 4,4'-thiobis(2,6-di-tert-butylphenol).

EXAMPLE 4

To a pressure reaction vessel fitted as in Example 1 is added 100 parts of monomethyl ether of diethylene glycol, 900 parts of water, 200 parts of 2-methyl-6-tert-butyl-4-chlorophenol and 150 parts of sodium monosulfide nonahydrate. The vessel is sealed and, while stirring, its temperature is raised to 200° C. After 2 hours, it is cooled and discharged. The product which has precipitated is 4,4'-thiobis(2-methyl-6-tert-butylphenol).

In the above example, good results are also obtained when other phenols are employed. For example, the use of 2-cyclohexyl-6-ethyl-4-bromophenol yields 4,4'-thiobis (2-cyclohexyl - 6 - ethylphenol). Likewise, 2(α-methylbenzyl)-6-cyclohexyl - 4 - chlorophenol leads to 4,4'-thiobis]2(α-methylbenzyl) - 6 - cyclohexylphenol]. The use of 2 - tert-octyl-6-(2,4-di-ethylcyclohexyl)-4-bromophenol leads to 4,4'-thiobis[2-tert-octyl-6-(2,4-di-ethylcyclohexyl)phenol]. In like manner, 2,6-diisopropyl-4-chlorophenol forms 4,4'-thiobis(2,6-diisopropylphenol). Also, 2,6-di-sec-butyl-4-bromophenol yields 4,4'-thiobis (2,6-di-sec-butylphenol). In a similar manner, any of the previously listed phenols may be employed in the above example, yielding the corresponding sterically hindered thiobisphenol.

EXAMPLE 5

To a reaction vessel as described in Example 1 is added 900 parts of methylethylketone, 150 parts water, 500 parts of 2,6-di(α-methylbenzyl)-4-bromophenol and 288 parts of sodium monosulfide nonahydrate. The reaction is stirred and refluxed for 24 hours, at which time 300 parts of additional water is added and the reaction cooled to room temperature. The product precipitated is 4,4'-thiobis [2,6-di(α-methylbenzyl)phenol].

In the above example, other co-solvents can be employed such as acetone, ethanol, isobutanol, monobutyl ether of ethylene glycol, diethylene glycol, and the like.

Likewise, potassium sulfide, anhydrous sodium sulfide, calcium sulfide and magnesium sulfide can be used in place of sodium sulfide nonahydrate. Furthermore, different halophenols can be substituted, resulting in the formation of the corresponding thiobisphenol.

EXAMPLE 6

To a pressure reaction vessel fitted as in Example 1 is added 500 parts of isopropanol, 500 parts of water, 150 parts of 2,6-di-cyclohexyl-4-chlorophenol and 22.2 parts of sodium monosulfide. The pressure vessel is flushed with nitrogen and sealed. While stirring, it is heated to 150° C., and stirred at this temperature for 6 hours. It is then cooled and discharged. The product which precipitates is 4,4'-thiobis(2,6-di-cyclohexylphenol).

As stated initially, the thiobis products formed by this invention are eminently useful as antioxidants. Tests were carried out to demonstrate this utility. One of these tests was the Panel Coker Test. In this test, one weight percent of the additive was blended in a mid-continent solvent-refined neutral oil which was placed in a test oil sump located within the Panel Coker apparatus. Positioned immediately above the oil sump is an aluminum plate which is electrically heated to 550° F. During the test, the oil is periodically splashed against the bottom of the heated aluminum plate and then allowed to drain back into the sump. The test cycle is such that oil is splashed for 5 seconds and then drains for 55 seconds, resulting in a one minute cycle. This cycle is continuously repeated for 10 hours. After this, the weight of deposit on the aluminum plate is determined. The more stability imparted by the additive the less will be the deposit weight. When this test was conducted on an unstabilized oil and an oil containing one weight percent of 4,4'-thiobis(2,6-di-tert-butylphenol) the following results were obtained.

Additive:                                      Deposit wt., mg.
  None _____  401
  4,4'-thiobis(2,6-di-tert-butylphenol) _____ 6

As this test shows, the products made by the present process are excellent antioxidants.

What is claimed is:

1. A process for making sterically hindered thiobisphenols comprising reacting a sterically hindered halophenol having the formula:

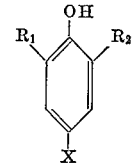

wherein $R_1$ is selected from the group consisting of alpha-branched alkyl radicals containing 3–20 carbon atoms, alpha-branched aralkyl radicals containing 8–20 carbon atoms and cycloalkyl radicals containing 6–20 carbon atoms, and $R_2$ is selected from the group consisting of alkyl radicals containing 1–20 carbon atoms, aralkyl radicals containing 7–20 carbon atoms and cycloalkyl radicals containing 6–20 carbon atoms, and X is selected from the group consisting of chlorine, bromine and iodine with a metal sulfide, with a sodium sulfide in a mutual solvent selected from the group consisting of:

(A) a mixture consisting essentially of from about 10–90 weight percent water and about 10–90 weight percent of a lower alkanol containing 1–4 carbon atoms;

(B) a mixture consisting essentially of from about 10–90 weight percent water and from 10–90 weight percent of a water soluble ketone containing from 3–4 carbon atoms; and (C) a mixture consisting essentially of from about 10–90 weight percent water and from about 10–90 weight percent of a water soluble ether alcohol.

2. The process of claim 1 wherein said mutual solvent consists essentially of from about 10–90 weight percent water and from about 10–90 weight percent of an alkanol containing from 1–4 carbon atoms.

3. The process of claim 1 wherein said hindered halophenol is 2,6-di-cyclohexyl-4-chlorophenol.

4. The process of claim 1 wherein said sterically hindered halophenol is 2-methyl-6-tert-butyl-4-chlorophenol.

5. The process of claim 1 wherein said sterically hindered halophenol is 2,6-di(α-methylbenzyl)-4-chlorophenol.

6. The process of claim 1 wherein said sterically hindered halophenol is 2,6-di-tert-butyl-4-bromophenol.

7. The process of claim 1 wherein said sterically hindered halophenol is 2,6-di-tert-butyl-4-chlorophenol.

8. The process of claim 1 wherein said mutual solvent consists essential of from 10–90 weight percent water and from 10–90 weight percent of a lower alkanol containing from 1–4 carbon atoms.

References Cited

UNITED STATES PATENTS 2,185,009   12/1939   Babcock et al. ____ 260—609 XR
3,322,834   5/1967    Hill et al. _____ 260—609

CHARLES B. PARKER, *Primary Examiner.*

D. R. PHILLIPS, *Assistant Examiner.*

PO-1050
(5/69)

UNITED STATES PATENT OFFICE
CERTIFICATE OF CORRECTION

Patent No. 3,449,441            Dated June 10, 1969

Inventor(s) Brian B. Dewhurst

It is certified that error appears in the above-identified patent and that said Letters Patent are hereby corrected as shown below:

In the claims, Claim 1, lines 51-52, delete "with a metal sulfide". Claim 8, line 1, "Claim 1" should read -- Claim 7 --; line 2, "essential" should read -- essentially --.

SIGNED AND
SEALED

NOV 4 1969

(SEAL)
Attest:

Edward M. Fletcher, Jr.
Attesting Officer

WILLIAM E. SCHUYLER, JR.
Commissioner of Patents